US010184666B2

(12) United States Patent
Meadows et al.

(10) Patent No.: US 10,184,666 B2
(45) Date of Patent: Jan. 22, 2019

(54) FUEL NOZZLE HAVING RESPECTIVE ARRAYS OF PRE-MIXING CONDUITS WITH RESPECTIVE VORTEX GENERATORS

(71) Applicant: Siemens Energy, Inc, Orlando, FL (US)

(72) Inventors: Joseph Meadows, Fort Mill, SC (US); Christian Beck, Essen (DE)

(73) Assignee: SIEMENS ENERGY, INC., Orlando, FL (US)

( * ) Notice: Subject to any disclaimer, the term of this patent is extended or adjusted under 35 U.S.C. 154(b) by 510 days.

(21) Appl. No.: 14/948,518

(22) Filed: Nov. 23, 2015

(65) Prior Publication Data

US 2017/0146242 A1    May 25, 2017

(51) Int. Cl.
| | |
|---|---|
| *F23R 3/12* | (2006.01) |
| *F23R 3/28* | (2006.01) |
| *F02C 7/22* | (2006.01) |
| *F23D 14/02* | (2006.01) |
| *F23D 14/64* | (2006.01) |

(52) U.S. Cl.
CPC .............. *F23R 3/286* (2013.01); *F02C 7/222* (2013.01); *F23D 14/02* (2013.01); *F23D 14/64* (2013.01); *F05D 2220/32* (2013.01); *F05D 2240/35* (2013.01); *F05D 2260/60* (2013.01); *F23D 2206/10* (2013.01); *F23D 2900/14004* (2013.01); *F23D 2900/14021* (2013.01); *F23R 3/12* (2013.01)

(58) Field of Classification Search
CPC .... F23R 3/286; F23R 3/12; F23R 3/20; F23C 7/002
See application file for complete search history.

(56) References Cited

U.S. PATENT DOCUMENTS

| | | | | |
|---|---|---|---|---|
| 5,361,586 A | * | 11/1994 | McWhirter | ............. F23D 14/02 60/737 |
| 5,613,363 A | | 3/1997 | Joshi et al. | |
| 8,113,821 B2 | * | 2/2012 | Feese | ..................... F23C 7/006 431/116 |
| 8,281,594 B2 | | 10/2012 | Wiebe | |

(Continued)

OTHER PUBLICATIONS

PCT International Search Report and Written Opinion dated Jan. 13, 2017 corresponding to PCT Application No. PCT/US2016/058972 filed Oct. 27, 2016.

*Primary Examiner* — Gerald L Sung

(57) ABSTRACT

A fuel nozzle including vortex generating features for use in a combustion turbine engine is provided. An array of inner pre-mixing conduits (20) extends between an inlet end (14) and an outlet end (16) of the nozzle. An array of outer pre-mixing conduits (22) may be disposed radially outwardly relative to the inner pre-mixing conduits (20). A fuel-directing tube (24) includes fuel-directing arms (26) structured to direct fuel flow into the outer pre-mixing conduits (22) to be mixed with a flow of air. The fuel-directing arms include a bluff structural arrangement (30) that may be disposed upstream of fuel injection locations (32, 32') into the outer pre-mixing conduits (22). The proposed nozzle is believed to provide superior micro-mixing capability, such as by increasing the depth of penetration of jets of fuel in a cross-flow of air, and/or formation of vortices in a wake zone downstream from the vortex generating features.

14 Claims, 3 Drawing Sheets

(56) References Cited

U.S. PATENT DOCUMENTS

| | | |
|---|---|---|
| 8,752,386 B2 | 6/2014 | Fox et al. |
| 2002/0192615 A1* | 12/2002 | Moriya .................. F23D 14/02 431/278 |
| 2009/0226852 A1 | 9/2009 | Feese et al. |
| 2011/0061390 A1 | 3/2011 | Kendrick |
| 2011/0289928 A1* | 12/2011 | Fox ........................ F23R 3/286 60/740 |

* cited by examiner

FUEL NOZZLE HAVING RESPECTIVE ARRAYS OF PRE-MIXING CONDUITS WITH RESPECTIVE VORTEX GENERATORS

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

BACKGROUND

1. Field

Disclosed embodiments are generally related to a fuel nozzle for use in a combustion turbine engine, such as a gas turbine engine and, more particularly, to a pre-mixing type of fuel nozzle that in one non-limiting application may be used in an injection subsystem for a distributed combustion system (DCS).

2. Description of the Related Art

In gas turbine engines, fuel is delivered from a fuel source to a combustion section where the fuel is mixed with air and ignited to generate hot combustion products defining working gases. The working gases are directed to a turbine section. The combustion section may comprise one or more stages, each stage supplying fuel to be ignited. See U.S. Pat. Nos. 8,281,594 and 8,752,386 in connection with fuel nozzles involving pre-mixing of air and fuel.

DETAILED DESCRIPTION

Figure 1:
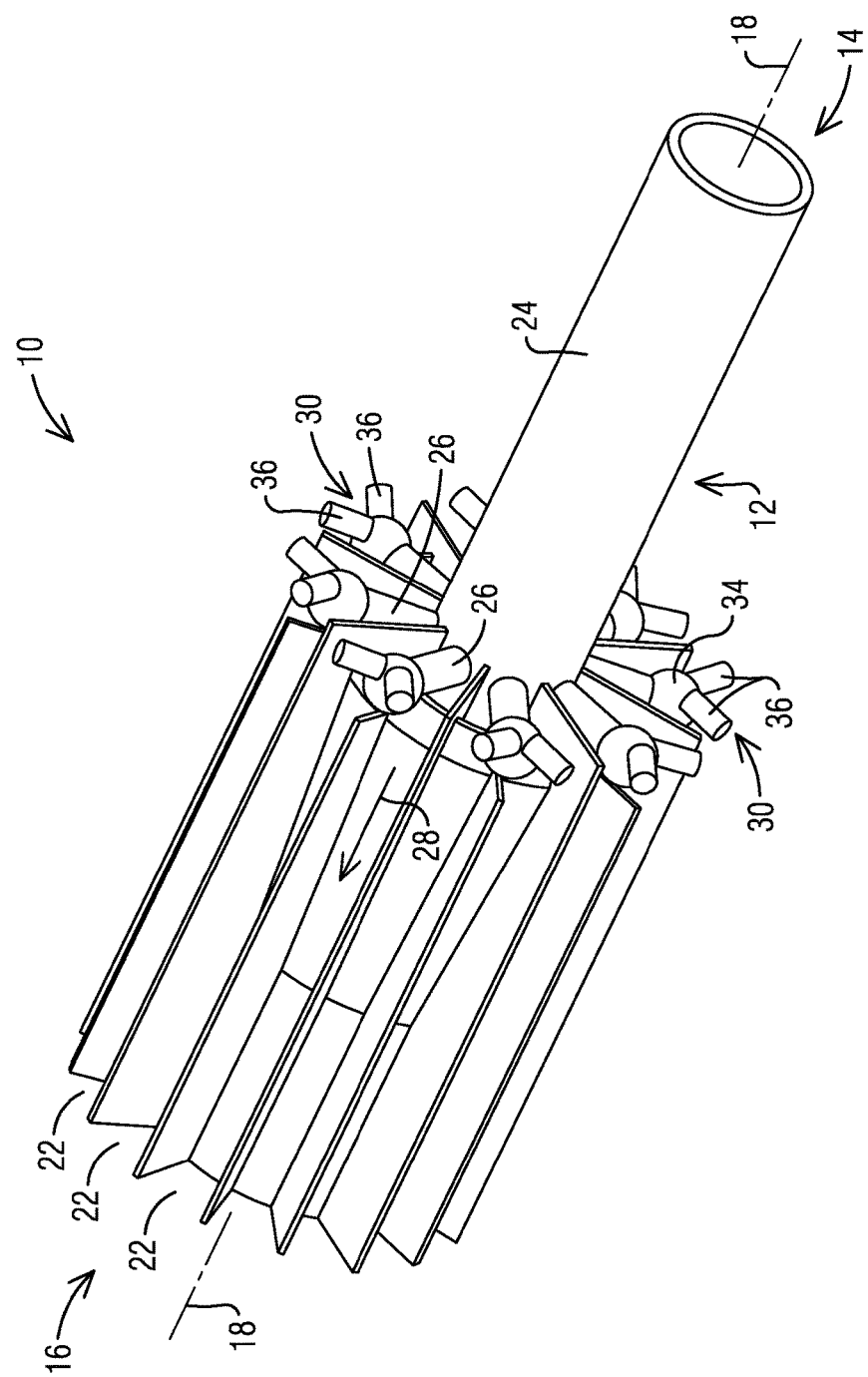
FIG. 1 is an isometric view that may be helpful for visualizing an upstream end of one non-limiting embodiment of a fuel nozzle embodying disclosed aspects that may be used in a combustor of a combustion turbine engine.

The inventors of the present invention have recognized certain issues that can arise in the context of certain prior art fuel nozzles involving pre-mixing of an oxidant (e.g., air) and a gaseous fuel. These prior art fuel nozzles generally involve a large number of point injection arrays having a relatively small diameter (also referred in the art as micro-mixing arrays), and the fabrication of such injection arrays may involve costly fabrication techniques. In view of such recognition, the present inventors propose an improved fuel nozzle having pre-mixing conduits configured with vortex generating features that can provide at least a two-fold benefit, such as increased depth of penetration of jets of fuel in a cross-flow of air; and superior mixing due to formation of vortices in a wake zone downstream from the vortex generating features. The proposed fuel nozzle can additionally benefit from more economical fabrication techniques while providing reduced levels of $NO_x$ emissions and enabling practically a flashback-free operation, even on applications involving fuel blends comprising high hydrogen content.

In the following detailed description, various specific details are set forth in order to provide a thorough understanding of such embodiments. However, those skilled in the art will understand that disclosed embodiments may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

FIG. 1 is an isometric view of one non-limiting embodiment of a fuel nozzle 10 embodying disclosed aspects that in one non-limiting application may be used in a combustor of a combustion turbine engine, such as a gas turbine engine. Fuel nozzle 10 includes a nozzle body 12 having an inlet end 14 (e.g., upstream end) and an outlet end 16 (e.g., downstream end) and defines a central axis 18 that extends between inlet end 14 and outlet end 16 along an axial direction of the fuel nozzle. Disclosed embodiments are described and illustrated in the context of a generally symmetrical fuel nozzle body geometry (e.g., exhibiting symmetry about central axis 18). It is noted, however, that such a geometry should be construed just in a non-limiting sense since other fuel nozzle geometries can equally benefit from concepts disclosed below in connection with vortex generating features. For example, the fuel nozzle geometry could be rectangular, such as may be implemented in connection with a fuel manifold type of nozzle.

Figure 2:
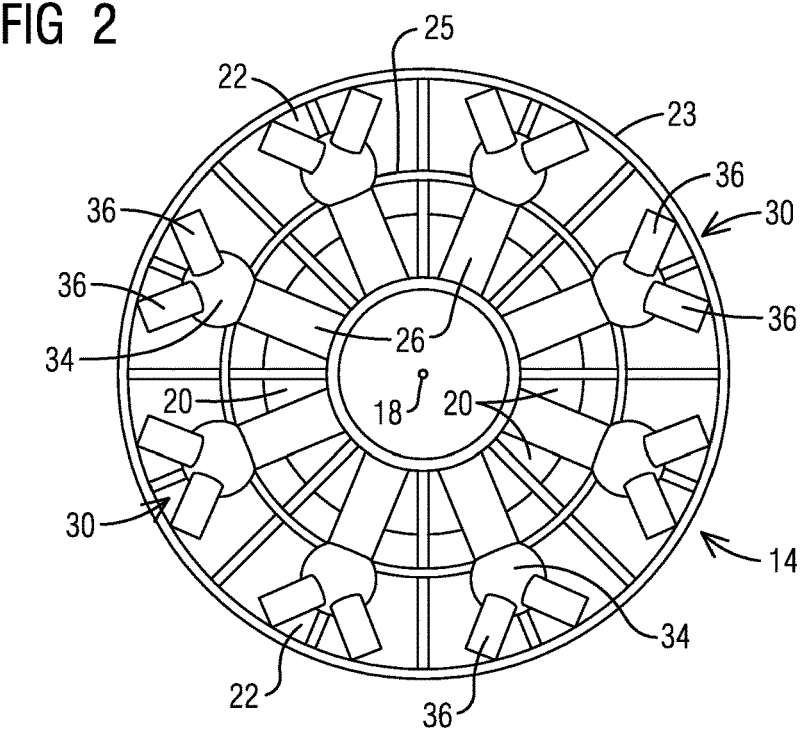
FIG. 2 is an elevation view of the upstream end of the fuel nozzle shown in FIG. 1.
Figure 3:
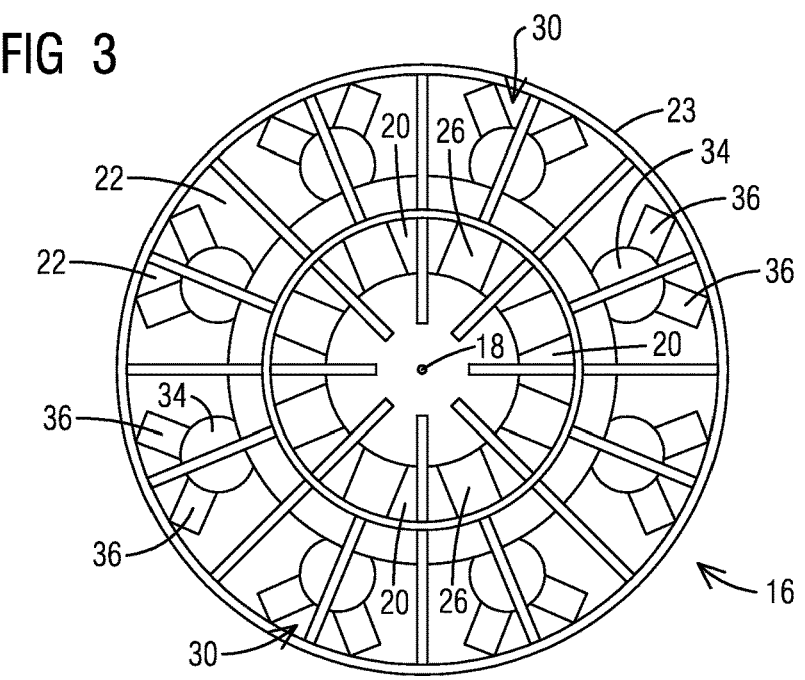
FIG. 3 is an elevation view of a downstream end of the fuel nozzle shown in FIG. 1.

In one non-limiting embodiment an array of inner pre-mixing conduits 20 (FIGS. 2 and 3) extends between inlet end 14 and outlet end 16 of the nozzle body. The array of inner pre-mixing conduits 20 is circumferentially disposed about the central axis 18 of the nozzle body. An array of outer pre-mixing conduits 22 (FIGS. 1-3) extends between the inlet end 14 and the outlet end 16 of the nozzle body. The array of outer pre-mixing conduits 22 is disposed radially outwardly relative to the array of inner pre-mixing conduits 20. An outer wall 23 may be used for circumferentially enclosing the outer pre-mixing conduits 22. For simplicity of illustration outer wall 23 is omitted in FIG. 1. It will be appreciated that the respective arrays of inner pre-mixing conduits 20 and outer pre-mixing conduits 22 are designed for effective micro-mixing of fuel and air. For example, such conduits can have a relatively large length-to-diameter ratio.

Figure 4:
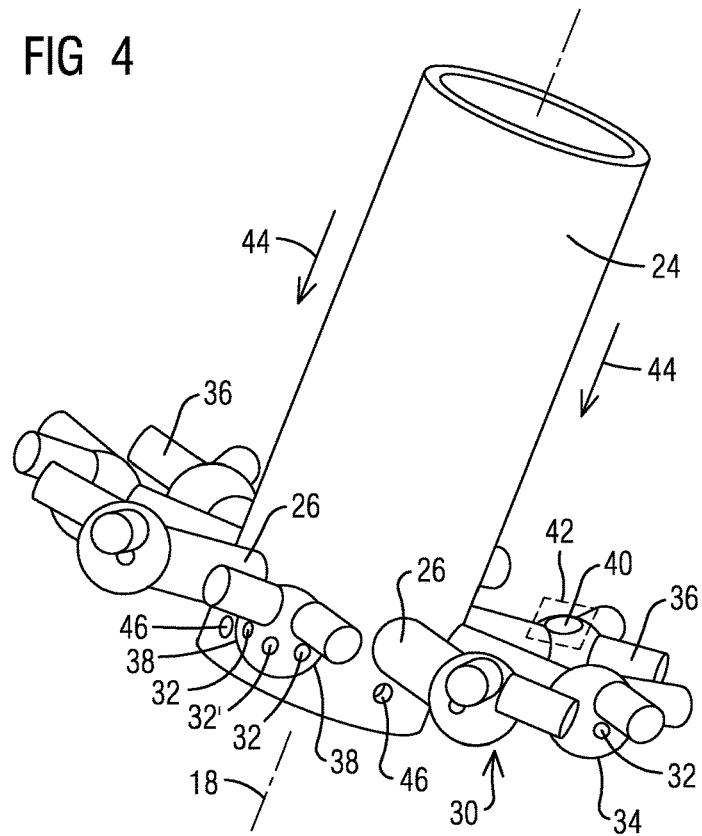
FIG. 4 is a fragmentary isometric view illustrating details of one non-limiting embodiment of a bluff structural arrangement as may comprise vortex generators in an outer pre-mixing conduit.
Figure 5:
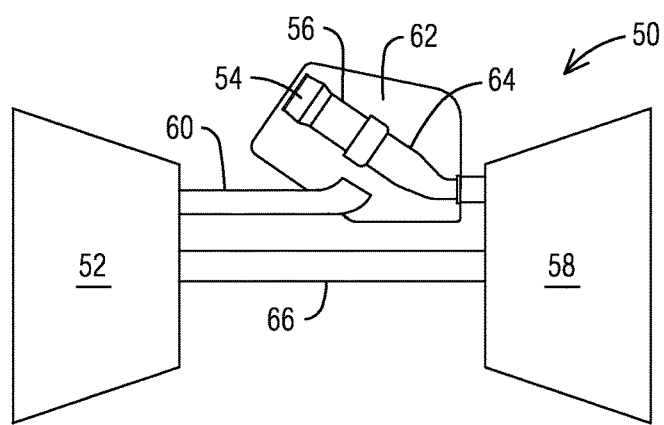
FIG. 5 is a simplified schematic of one non-limiting embodiment of a combustion turbine engine, such as a gas turbine engine, that can benefit from disclosed embodiments.

A fuel-directing tube 24 (FIG. 1) in the nozzle body includes a plurality of radially extending fuel-directing arms 26. Each respective fuel-directing arm 26 may be internally structured to direct fuel flow into outer pre-mixing conduits 22 to be mixed with a flow of air (schematically represented by arrow 28 in FIG. 1) that flows in a direction from inlet end 14 towards outlet end 16. Each respective fuel-directing arm 26 may include a bluff structural arrangement 30 relative to the flow of air 28. The bluff structural arrangement 30 may be disposed upstream of fuel injection locations, such as fuel injection orifices 32 (FIG. 4) that inject fuel into one or more of outer pre-mixing conduits 22. FIG. 4 is a fragmentary isometric view that for simplicity of illustration omits a conduit-separating structure 25 (FIGS. 2 and 3) that separates the array of inner pre-mixing conduits 20 from the array of outer pre-mixing conduits 22. That is, mutually independent premixing is carried out in the respective arrays of inner pre-mixing conduits 20 and outer pre-mixing conduits 22.

Bluff structural arrangement 30 may be conceptualized as one non-limiting embodiment of a vortex generator in outer pre-mixing conduits 22. In one non-limiting embodiment, fuel may be injected as a jet in cross-flow (JICF). As will be appreciated by those skilled in the art, the magnitude of jet penetration depth can substantially contribute to the quality of fuel/air mixing. The present inventors have recognized that the bluff structural arrangement 30 may be effectively used to reduce a cross-flow momentum flux, which advantageously increases jet penetration depth, and this substantially improves the quality of fuel/air mixing in outer pre-mixing conduits 22. Additionally, as noted above, bluff structural arrangement 30 can operate as a vortex generator effective to form vortices in a wake zone downstream from the vortex generating features and a resulting large-scale turbulence can further improve the quality of the fuel/air mixing in outer pre-mixing conduits 22.

In one non-limiting embodiment, each respective fuel-directing arm 26 includes a distal end, such as a spheroid-shaped distal end 34, protruding into one or more of the outer pre-mixing conduits 22. As noted above, distal end 34 includes at least one fuel injection orifice 32 (FIG. 4) arranged to inject a respective jet of fuel into one or more of the outer pre-mixing conduits 22. It will be appreciated that distal end 34 need not have a spheroid shaped configuration since other geometrical configurations may be used equally effective, e.g., cubical, trapezoidal, other curved shapes, etc.

In one non-limiting embodiment, the bluff structural arrangement 30 comprises one or more fingers 36 (e.g., vortex generating features) extending from the distal end 34 of the respective fuel-directing arm 26 into one or more of the outer pre-mixing conduits 22 to interfere with the flow of air passing there through. The one or more fingers are disposed upstream relative to fuel injection orifices 32. The cross-section of fingers 36 may (but need not) be cylindrical, since other cross-sections (effective to form bluff bodies) may be used, such as rectangular, triangular, other curved-shapes, etc.

In one non-limiting embodiment, two fuel injection orifices 32 may be respectively disposed at mutually opposed hemispheres 38 (FIG. 4) of the spheroid-shaped distal end 34, and in this case the bluff structural arrangement 30 may comprise two respective fingers 36 each respectively extending from the mutually opposed hemispheres 38 of the spheroid-shaped distal end into a respective one of the outer pre-mixing conduits 22 to interfere with the flow of air passing there through. The two fingers 36 may be respectively disposed upstream relative to respective two fuel injection orifices 32. In one non-limiting embodiment, the spheroid-shaped distal end 34 may include a third fuel injection orifice 32' disposed intermediate the mutually opposed hemispheres 38 of the spheroid-shaped distal end 34. Third fuel injection orifice 32' may be arranged to inject fuel into any two adjacent outer pre-mixing conduits 22. In one non-limiting embodiment, the spheroid-shaped distal end 34 includes a flat surface 40, as may be defined by a transverse cutting plane 42. One such plane is conceptually illustrated in FIG. 4. In one non-limiting embodiment, flat surface 40 is positioned to interfere with the flow of air passing there through. The foregoing arrangement is described and illustrated in the context of a spheroid-shaped distal end. However, as previously discussed, this should be construed in a non-limiting sense since other configurations may be used equally effectively to meet the needs of a given application.

In one non-limiting embodiment, each respective fuel-directing arm 26 constitutes a respective bluff body relative to a flow of air (schematically represented by arrow 44 (FIG. 4)) in the inner pre-mixing conduits. The respective bluff body may be arranged to radially traverse a respective one of the array of inner pre-mixing conduits 20. As may be further appreciated in FIG. 4, fuel-directing tube 24 defines one or more fuel injection orifices 46 to inject a jet of fuel into a respective one of the inner pre-mixing conduits 20. In one non-limiting embodiment, each respective bluff body may be disposed upstream relative to a respective one of the fuel injection orifices 46 in the inner pre-mixing conduits 20. The respective cross-sections of fuel-directing arms 26 may (but need not) include corners (e.g., rectangular, triangular, etc.) since other cross-sections (bluff bodies) may be used, e.g., cylindrical, other curved-shapes, etc.

As discussed above in the context of outer pre-mixing conduits 22, in this case the respective bluff bodies defined by each respective fuel-directing arm 26 in the respective inner pre-mixing conduits 20 may be effectively used to reduce the cross-flow momentum flux in the inner pre-mixing conduits 20, which advantageously increases jet penetration depth, thus independently contributing to the quality of fuel/air mixing in the inner pre-mixing conduits 20. Additionally, the respective bluff bodies defined by each respective fuel-directing arm 26 in the respective inner pre-mixing conduits 20 function as vortex generators that form vortices in a wake zone downstream from such bluff bodies and a resulting turbulence further contributes to the quality of fuel/air mixing in inner pre-mixing conduits 20.

In one non-limiting embodiment, fuel-directing arms 26 may extend perpendicular relative to fuel-directing tube 24 (FIG. 4). It will be appreciated that fuel-directing arms 26 need not extend perpendicular relative to fuel-directing tube 24 since in certain applications the fuel-directing arms 26 could extend slanted towards a downstream direction with respect to airflow 44; or alternatively, the fuel-directing arms 26 could extend slanted away from the downstream direction. Accordingly, the structural arrangement shown in FIG. 4 for fuel-directing arms 26 should not be construed in a limiting sense.

FIG. 7 is a simplified schematic of one non-limiting embodiment of a combustion turbine engine 50, such as gas turbine engine, that can benefit from disclosed embodiments. Combustion turbine engine 50 may comprise a compressor 52, a combustor 54, a combustion chamber 56, and a turbine 58. During operation, compressor 52 takes in ambient air and provides compressed air to a diffuser 60, which passes the compressed air to a plenum 62 through which the compressed air passes to combustor 54, which mixes the compressed air with fuel, and provides combusted, hot working gas via a transition 64 to turbine 58, which can drive power-generating equipment (not shown) to generate electricity. A shaft 66 is shown connecting turbine 58 to drive compressor 52. Disclosed embodiments of a fuel nozzle may be incorporated in combustor 54 of the combustion turbine engine to achieve superior pre-mixing of fuel and air.

In operation and without limitation, disclosed embodiments are expected to provide a cost-effective fuel nozzle including independent arrays of fluid flow pre-mixing conduits that produce a substantially homogenous mixture of fuel and air at the outlet end of the nozzle and thus effective to produce appropriate pre-mixing of fuel and air conducive to ultra-low levels of $NO_x$ emissions. Additionally, disclosed embodiments have flashback resistance that is substantially high, even for fuel blends comprising a high hydrogen content (e.g., at least 50% hydrogen content by volume).

Without limitation, practical embodiments of the disclosed fuel nozzle may comprise fluid flow conduits having a diameter in the order of approximately 10 mm and may include fuel injection orifices having a minimum diameter in a range from about 0.75 mm to about 1 mm and thus capable of benefitting from relatively lower-cost manufacturing technologies, such as, without limitation, three-dimensional (3D) printing, direct metal laser sintering (DLMS), etc., in lieu of presently costlier manufacturing technologies.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A fuel nozzle comprising:
a nozzle body having an inlet end and an outlet end and defining a central axis that extends between the inlet end and the outlet end along an axial direction of the fuel nozzle;
an array of inner pre-mixing conduits extending between the inlet end and the outlet end of the nozzle body, the array of inner pre-mixing conduits disposed about the central axis of the nozzle body;
an array of outer pre-mixing conduits extending between the inlet end and the outlet end of the nozzle body, the array of outer pre-mixing conduits disposed outwardly relative to the array of inner pre-mixing conduits; and
a fuel-directing tube in the nozzle body comprising a plurality of fuel-directing arms, each respective fuel-directing arm structured to direct fuel flow into at least one of the outer pre-mixing conduits to be mixed with a flow of air, each respective fuel-directing arm including a bluff structural arrangement relative to the flow of air, the bluff structural arrangement disposed upstream of fuel injection locations that inject fuel into said at least one of the outer pre-mixing conduits;
wherein each respective fuel-directing arm comprises a distal end protruding into said at least one of the outer pre-mixing conduits, wherein the distal end includes at least one fuel injection orifice to inject a respective jet of fuel into said at least one of the outer pre-mixing conduits; and
wherein the distal end of a fuel-directing arm protruding into said at least one of the outer pre-mixing conduits comprises a spheroid-shaped distal end.

2. The fuel nozzle of claim 1, wherein the bluff structural arrangement comprises at least one finger extending from the distal end of the respective fuel-directing arm into said at least one of the outer pre-mixing conduits to interfere with the flow of air passing there through, said at least one finger disposed upstream relative to said at least one fuel injection orifice.

3. The fuel nozzle of claim 1, wherein each respective fuel-directing arm constitutes a respective bluff body relative to a flow of air in the inner pre-mixing conduits, the respective bluff body arranged to radially traverse a respective one of the array of inner pre-mixing conduits.

4. The fuel nozzle of claim 3, wherein the fuel-directing tube defines at least one fuel injection orifice to inject a jet of fuel into a respective one of the inner pre-mixing conduits, wherein the respective bluff body is disposed upstream relative to said at least one fuel injection orifice in the respective one of the inner pre-mixing conduits.

5. The fuel nozzle of claim 1, wherein the plurality of fuel-directing arms extends from the fuel-directing tube at a respective angle slanted towards a downstream direction with respect to the airflow.

6. The fuel nozzle of claim 1, wherein the plurality of fuel-directing arms extends perpendicular relative to the fuel-directing tube.

7. The fuel nozzle of claim 1, wherein the spheroid-shaped distal end includes two fuel injection orifices disposed at mutually opposed hemispheres of the spheroid-shaped distal end, wherein the bluff structural arrangement comprises two fingers extending from the mutually opposed hemispheres of the spheroid-shaped distal end into a respective one of the outer pre-mixing conduits to interfere with the flow of air passing there through, said two fingers disposed upstream relative to said two fuel injection orifices.

8. The fuel nozzle of claim 7, wherein the spheroid-shaped distal end includes a flat surface defined by a transverse cutting plane, the flat surface positioned to interfere with the flow of air passing there through.

9. The fuel nozzle of claim 8, wherein the spheroid-shaped distal end includes a third fuel injection orifice disposed intermediate the two fuel injection orifices disposed at the mutually opposed hemispheres of the spheroid-shaped distal end.

10. A fuel nozzle comprising:
a nozzle body having an inlet end and an outlet end and defining a central axis that extends between the inlet end and the outlet end along an axial direction of the fuel nozzle;
an array of inner pre-mixing conduits extending between the inlet end and the outlet end of the nozzle body, the array of inner pre-mixing conduits disposed about the central axis of the nozzle body;
an array of outer pre-mixing conduits extending between the inlet end and the outlet end of the nozzle body, the array of outer pre-mixing conduits disposed outwardly relative to the array of inner pre-mixing conduits;
a fuel-directing tube in the nozzle body comprising a plurality of fuel-directing arms, each respective fuel-directing arm structured to direct fuel flow into at least one of the outer pre-mixing conduits to be mixed with a flow of air; and vortex generators respectively arranged in the outer and in the inner pre-mixing conduits;
wherein at least one of said vortex generators in said outer pre-mixing conduit is disposed upstream of fuel injection locations that inject fuel into the outer pre-mixing conduit;
wherein each respective fuel-directing arm comprises a distal end protruding into said at least one of the outer pre-mixing conduits, wherein the distal end includes at least one fuel injection orifice to inject a respective jet of fuel into the outer pre-mixing conduit; and
wherein the distal end comprises a spheroid-shaped distal end including two fuel injection orifices disposed at mutually opposed hemispheres of the spheroid-shaped distal end, wherein the vortex generator in the outer pre-mixing conduit comprises two fingers extending from the mutually opposed hemispheres of the spheroid-shaped distal end into a respective one of the outer pre-mixing conduits, said two fingers disposed upstream relative to said two fuel injection orifices.

11. The fuel nozzle of claim 10, wherein the at least one of said vortex generators in the outer pre-mixing conduit comprises at least one finger extending from a distal end of the respective fuel-directing arm into the outer pre-mixing conduit, said at least one finger disposed upstream relative to said at least one fuel injection orifice.

12. The fuel nozzle of claim 10, wherein at least one of said vortex generators in said inner pre-mixing conduit comprises a respective fuel-directing arm having a respective bluff body relative to a flow of air in the inner pre-mixing conduit, the respective bluff body arranged to radially traverse the inner pre-mixing conduit.

13. The fuel nozzle of claim 12, wherein the fuel-directing tube defines at least one fuel injection orifice to inject a jet of fuel the inner pre-mixing conduits, wherein the respective bluff body is disposed upstream relative to said at least one fuel injection orifice in the inner pre-mixing conduit.

14. The fuel nozzle of claim 10, wherein the spheroid-shaped distal end includes a third fuel injection orifice disposed intermediate the two fuel injection orifices disposed at the mutually opposed hemispheres of the spheroid-shaped distal end.

* * * * *